United States Patent
Poirier

(10) Patent No.: US 7,098,653 B2
(45) Date of Patent: Aug. 29, 2006

(54) PHASE ANGLE DETERMINING CIRCUIT

(75) Inventor: Norman Poirier, Raynham, MA (US)

(73) Assignee: Stoneridge Control Devices, Inc., Canton, MA (US)

( * ) Notice: Subject to any disclaimer, the term of this patent is extended or adjusted under 35 U.S.C. 154(b) by 490 days.

(21) Appl. No.: 10/314,911

(22) Filed: Dec. 9, 2002

(65) Prior Publication Data

US 2003/0132761 A1 Jul. 17, 2003

Related U.S. Application Data

(60) Provisional application No. 60/340,668, filed on Dec. 7, 2001.

(51) Int. Cl.
*G01B 7/30* (2006.01)

(52) U.S. Cl. .................. 324/207.25; 702/151

(58) Field of Classification Search ........... 324/207.15, 324/207.16, 207.17, 207.18, 207.2, 207.21, 324/207.25, 260; 338/32 R, 32 H; 702/150, 702/151

See application file for complete search history.

(56) References Cited

U.S. PATENT DOCUMENTS

| 4,490,674 | A | * | 12/1984 | Ito ......................... 324/207.25 |
| 4,791,366 | A | * | 12/1988 | Suzuki et al. .......... 324/207.25 |
| 5,168,222 | A | * | 12/1992 | Volsin et al. .......... 324/207.17 |
| 5,880,586 | A | | 3/1999 | Dukart et al. ............ 324/207.2 |
| 6,104,328 | A | | 8/2000 | Alhorn et al. ............. 341/112 |
| 6,304,076 | B1 | * | 10/2001 | Madni et al. .......... 324/207.17 |

FOREIGN PATENT DOCUMENTS

JP 60-162920 * 8/1985

* cited by examiner

*Primary Examiner*—Jay Patidar
(74) *Attorney, Agent, or Firm*—Grossman, Tucker, Perreault & Pfleger, PLLC

(57) ABSTRACT

A phase angle determining circuit for determining a phase angle from a first input signal and a second input signal includes an input circuit configured to receive the first input signal and the second input signal and to provide a third signal, and an output circuit configured to receive the third signal and to provide an output signal representative of the phase angle. The first and second signal may be provided by a transducer. The transducer may be a steering wheel transducer and the phase angle determining system may be utilized in a vehicle system to control a vehicle system based on the phase angle of the steering wheel.

6 Claims, 5 Drawing Sheets

PHASE ANGLE DETERMINING CIRCUIT

CROSS REFERENCE TO RELATED APPLICATIONS

This application claims the benefit of the filing date of U.S. Provisional Application Ser. No. 60/340,668, filed Dec. 7, 2001, the teachings of which are incorporated herein by reference.

FIELD OF THE INVENTION

The present invention relates generally to a phase angle determining circuit, and in particular to the use of such a circuit coupled to a rotary sensor for determining a rotary angle from such a sensor.

BACKGROUND OF THE INVENTION

A variety of transducers, including rotary sensors, may produce sine and cosine signals based on the angle of rotation of a monitored device. The monitored device may be any device that moves in a rotary fashion over a 0 to 359 degree range, e.g., a steering wheel or a valve to name only a couple. From the sine and cosine input signals, the angle of rotation needs to be extracted.

A common method of extracting the angle of rotation, or $\theta$, from sine $\theta$ and cosine $\theta$ signals is to encode each signal into a digital signal and then use a software routine, e.g., CORDIC routine, to extract $\theta$. Essentially, the software routine solves the arctangent of the ratio of the sine $\theta$ and cosine $\theta$ values as detailed in equation (1).

$$\theta = \text{ARCTAN}(\text{SIN }\theta/\text{COS }\theta) \quad (1)$$

In order to extract $\theta$ using this method, it is necessary to convert an analog signal to a digital signal, e.g., via an A/D converter, to use some microprocessor or microcomputer to run the stored software routine, to store the software routine in memory, and to output the results via a D/A converter. Accordingly, there is a need for an alternative hardware apparatus for extracting a phase angle from sine and cosine signals.

BRIEF SUMMARY OF THE INVENTION

A phase angle determining circuit for determining a phase angle from a first input signal and a second input signal consistent with the invention includes: an input circuit configured to receive the first input signal and the second input signal and to provide a third signal; and an output circuit configured to receive the third signal and to provide an output signal representative of the phase angle. The input circuit may further include: a first multiplier circuit configured to receive the first input signal and a first sinusoidal signal and provide a first multiplier output signal; a second multiplier circuit configured to receive the second input signal and a second sinusoidal signal and provide a second multiplier output signal; and an adder circuit configured to sum the first output multiplier signal and the second output multiplier signal and to provide the third signal.

According to another aspect of the invention, there is provided a system for sensing a rotational angle of an object relative to a predetermined position. The system includes: a transducer configured to sense the rotational angle of the object and to provide a first input signal and a second input signal based on the rotational angle; a rotational angle determining circuit for determining the rotational angle from the first input signal and the second input signal. The rotational angle determining circuit includes: an input circuit configured to receive the first input signal and the second input signal and to provide a third signal; and an output circuit configured to receive the third signal and to provide an output signal representative of the phase angle.

According to another aspect of the invention, there is provided a method of determining a phase angle from a first input signal and a second input signal, the method consistent with the invention includes the steps of: multiplying the first input signal by a first sinusoidal signal to provide a first multiplier output signal; multiplying the second input signal by a second sinusoidal signal to provide a second multiplier output signal; adding the first multiplier output signal with the second multiplier output signal to provide a third signal; and extracting the phase angle from the third signal.

According to yet a further aspect of the invention, there is provided a vehicle steering wheel system for sensing a rotational angle of a steering wheel relative to a predetermined position. The system includes: a transducer configured to sense the rotational angle of the steering wheel and to provide a first input signal and a second input signal based on the rotational angle; a steering wheel rotational angle determining circuit for determining the rotational angle from the first input signal and the second input signal, the rotational angle determining circuit including: an input circuit configured to receive the first input signal and the second input signal and to provide a third signal; and an output circuit configured to receive the third signal and to provide an output signal representative of the phase angle; and a controller configured to accept the output signal from the steering wheel rotational angle determining circuit to control a vehicle system based on the phase angle of the steering wheel.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION

Figure 1:
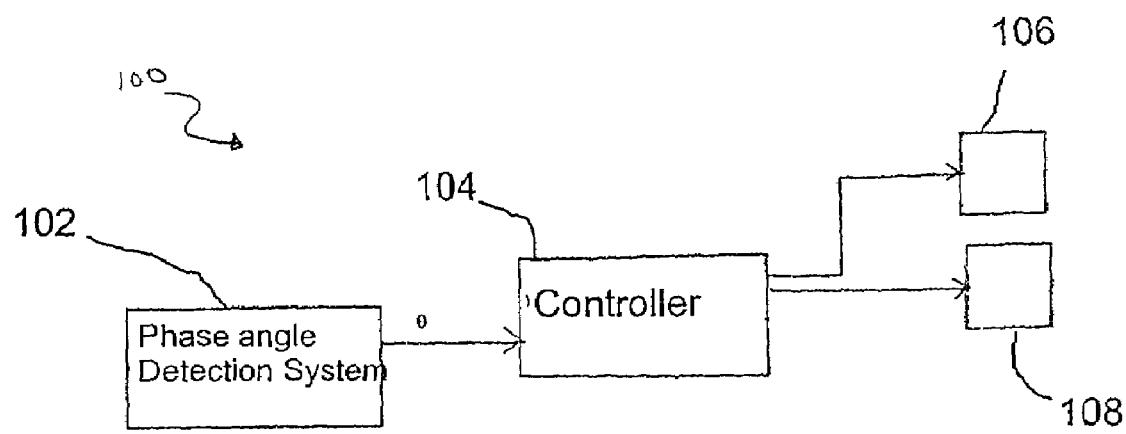
FIG. 1 is a simplified block diagram of a control system utilizing a phase angle detection system consistent with the present invention.

FIG. 1 is a simplified block diagram of a control system 100 utilizing a phase angle detection system 102 consistent with the present invention. Those skilled in the art will recognize a variety of control applications for a phase angle detection system 102 consistent with the present invention. It is to be understood, therefore, that the embodiments described herein are described by way of illustration, not of limitation. One such control system 100 may include a phase angle detection system 102 for detecting the position of a steering wheel in a vehicle. The phase angle detection system 102 may include a sensor part and phase angle circuit consistent with the present invention as detailed further herein.

When used in a steering wheel application of a vehicle, the phase angle detection system produces the angular position or phase angle θ of the steering wheel between 0 and 359 degrees. This phase angle θ of the steering wheel may then be provided to a controller 104. The controller 104 may utilize this phase angle θ data in a variety of vehicle systems 106, 108.

Such systems may include automatic braking 106 where breaking is influenced by the position of the steering wheel. Such systems may also include traction control 108 where engine responsiveness and other items are also influenced by the position of the steering wheel. Such phase angle θ position data of the steering wheel may also be used to assist in turn signal activation and deactivation. For example, if the steering wheel has been relatively straight for a predetermined time and distance interval, a turn signal may be automatically deactivated.

Figure 2:
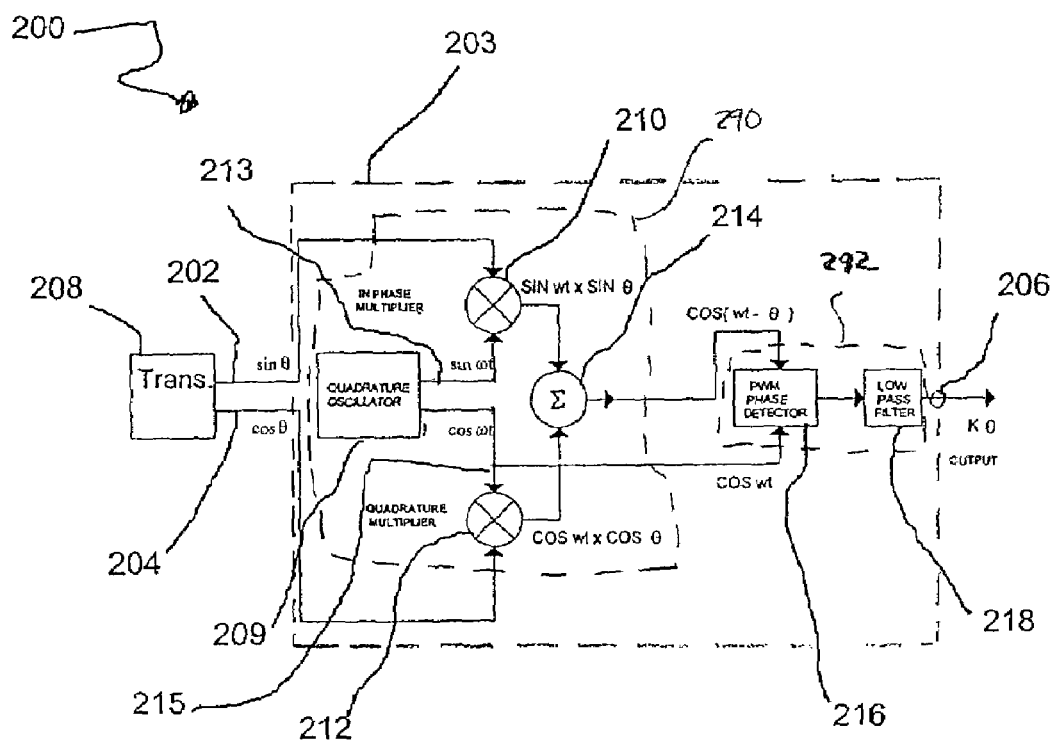
FIG. 2 is a block diagram of one exemplary phase angle detection system including a transducer coupled to a phase angle determining circuit consistent with the present invention.

Turing to FIG. 2, a block diagram of one exemplary phase angle detection system 200 including a transducer 208 coupled to a phase angle phase angle determining circuit 203 consistent with the present invention is illustrated. In general, the phase angle determining circuit includes an input circuit 290 and an output circuit 292. The input circuit 290 is configured to receive input signals sin θ and cos θ and to provide a signal, e.g. cos(ωt−θ), to the output circuit 292. The output circuit 292 is configured to receive the cos(ωt−θ) signal from the input circuit and provide an output signal at terminal 206 representative of the phase angle θ.

The phase angle determining circuit 203 may accept signals from the transducer 208. Such signals may include a sine input signal received over path 202, and a cosine input signal received over path 204. The phase angle determining circuit 203 extracts an output signal available at output terminal 206 indicative of the phase angle θ of the respective sine and cosine signals.

The transducer 208 may produce the sine and cosine input signals. Those skilled in the art will recognize a variety of transducers 208, such as a rotary sensor for instance, that may produce such sine and cosine input signals. The sine component input signal, e.g., sin θ, may be fed via a first input path 202 to an in phase multiplier 210. The cosine component input signal, e.g., cos θ, may be fed via a second input path 204 to a second quadrature multiplier 212.

The input circuit 290 may include a pair of multiplying circuits 210, 212 and an adder circuit 214 as further detailed herein. A quadrature oscillator 209 may be utilized to provide a first generated signal, sin ωt. This sin ωt signal may also be provided to the in phase multiplier 210, via a separate first oscillator input path 213. Similarly, the quadrature oscillator 209 may also generate a second generated signal, cos ωt, that may be provided to the quadrature multiplier 212 via a second oscillator input path 215.

The in phase multiplier 210 multiplies the input sine signal from the transducer 208 by the first generated signal, sin ωt, from the quadrature oscillator 209 to produce sin θ×sin ωt. Similarly, the quadrature multiplier 212 multiplies the input cosine signal from the transducer 208 by the second generated signal, cos ωt, from the quadrature oscillator 209 to produce cos θ×cos ωt. Both signals, (sin θ×sin ωt) and (cos θ×cos ωt), may then be summed together by adder circuit 214.

The adder circuit produces a summed signal, [cos(ωt−θ)] in accordance with Equations (2)–(4) below $$\sin\theta \times \sin\omega t = \tfrac{1}{2}[\cos(\omega t-\theta)-\cos(\omega t+\theta)] \quad (2)$$

$$\cos\theta \times \cos\omega t = \tfrac{1}{2}[\cos(\omega t-\theta)+\cos(\omega t+\theta)] \quad (3)$$

$$[\tfrac{1}{2}[\cos(\omega t-\theta)-\cos(\omega t+\theta)]]+[\tfrac{1}{2}[\cos(\omega t-\theta)+\cos(\omega t+\theta)]]=[\cos(\omega t-\theta)] \quad (4)$$

The summed signal [cos(ωt−θ)] is a sinusoid signal having an angular frequency of ωt and a phase shift angle of θ. The signal [cos(ωt−θ)] may then be provided to a PWM phase detector 216. The PWM phase detector 216 may also accept the cos ωt signal from the quadrature oscillator 209. The PWM phase detector 216 may include a comparator for converting the [cos(ωt−θ)] signal to a similar square wave signal with a phase angle θ. The PWM phase detector 216 may further include logic gates to extract the phase angle θ from the square wave signal output from the comparator.

Figure 3:
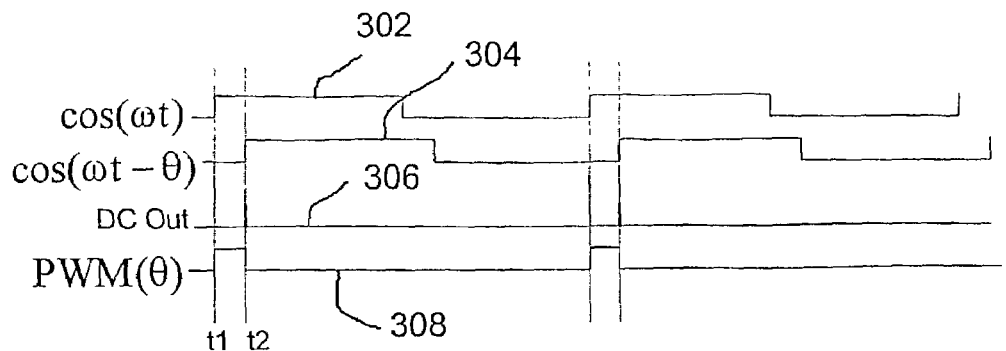
FIG. 3 is a timing diagram illustrating various signals from the phase angle determining circuit of FIG. 2.

One process of extracting the phase angle θ can be accomplished as illustrated in the timing diagram of FIG. 3. A square wave, cos ωt, as originally produced by a quadrature oscillator 209 is illustrated by plot 302. This cos ωt signal has an angular frequency of ωt with a 0 degree phase angle. The [cos(ωt−θ)] sinusoidal signal may be converted to a [cos(ωt−θ)] square wave signal 304 by a comparator included in the PWM phase detector 216. The resulting square wave signal 304 has an angular frequency of ωt with a phase angle of θ.

A pulse width modulated signal PWM (θ), where the width of the pulses varies directly with the phase angle θ, is illustrated by plot 308. The PWM (θ) signal 308 may be produced by clocking a logic "1" into a D type flip-flop at time t1 when the leading edge of the cos ωt signal rises, and clearing the D-type flip-flop at time t2 corresponding to the leading edge of the [cos(ωt−θ)] square wave signal 304. By producing and clearing a logic "1" into a D type flip-flop at times t1 and t2, the PWM (θ) signal 308 has a pulse width that is directly proportional to the phase angle θ. Those skilled in the art will recognize other ways to produce the PWM (θ) signal 308. Accordingly, the phase angle θ may be extracted from this PWM (θ) signal 308.

Alternatively, PWM phase detector 216 may produce a DC output signal 306 where the output level directly corresponds to the phase angle θ. To accomplish this, a low pass filter 218 having a cutoff frequency below ωt may be utilized. This low pass filter 218 may accept the PWM (θ) signal 308 and produce a DC output signal 306 whose DC average is directly proportional to the phase angle θ.

Figure 4:
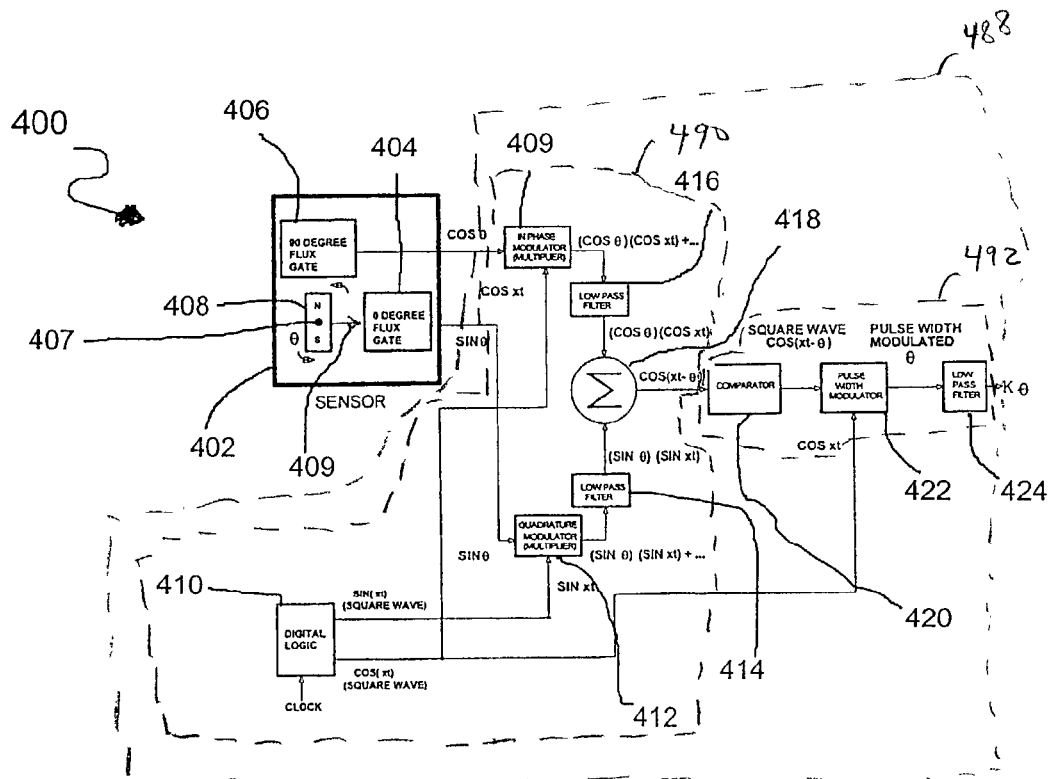
FIG. 4 is a block diagram of another embodiment of an exemplary phase angle detection system including a rotary sensor.

A more detailed block diagram of one exemplary phase angle detection system 400 utilizing a phase angle detection circuit 488 consistent with the present invention having an input circuit 490 and an output circuit 492 is illustrated in FIG. 4. The phase angle detection circuit may be coupled to a rotary sensor 402. In one of many embodiments, the rotary sensor 402 may be utilized to sense position of a steering wheel in a vehicle as earlier detailed. The rotary sensor 402 may also be a rotating magnet type sensor. Such a sensor may include a permanent magnet 408 having a north and south pole that rotates about a center axis 407. The rotating magnet type sensor may also include a plurality of magnetic field sensors, e.g., Hall type sensors, strategically located relative to the rotating magnet 408.

In the illustrated configuration, a first magnetic field sensor 404 may be located at 0 degrees relative to a direction line 409 from the center axis 407. The rotating magnet type sensor may also have a second magnetic field sensor 406 located at 90 degrees relative to the same direction line 409 from the center axis 407. The magnetic field produced by the magnet 408 is thus sensed by the sensors 404, 406 as the magnet rotates from 0 degrees to 359 degrees relative to the direction line 409. The varying magnetic field sensed by the first sensor 404 is 90 degrees out of phase with the varying magnetic field sensed by the second sensor 406 as the magnetic rotates. As such, the first sensor 404 produces the sine input signal, e.g., sin θ, and the second sensor 406 produces the cosine input signal, e.g., cos θ, depending on the angular position θ of the magnet.

The sine input signal, e.g., sin θ, may be provided to quadrature multiplier 412, which multiplies the sine input signal by a sine xt square wave signal generated by digital logic 410. The resulting signal (sin θ) (sin xt)+ ... may then be provided to a low pass filter 414 to filter out the higher frequency harmonics. The resulting signal (sin θ) (sin xt) may then be provided to adder 418. Similarly, the cosine input signal, e.g., cos θ, may be provided to a separate in-phase quadrature multiplier 409, which multipliers the cosine input signal by a cos xt square wave signal generated by digital logic 410. The resulting signal (cos θ) (cos xt)+ ... may then be provided to a low pass filter 416 to filter out higher frequency harmonic. The resulting signal (cos θ) (cos xt) may then be further provided to the adder 418.

By virtue of the trigonometric identities earlier detailed with reference to FIG. 2, the adder produces a cos(xt−θ) sinusoidal signal. A comparator 420 may accept such signal to produce a cos(xt−θ) square wave signal. A pulse width modulator 422 may produce a logic "1" at the leading edge of the cos xt signal from digital logic 410, and may clear the logic "1" at the leading edge of the cos(xt−θ) square wave signal as earlier detailed to produce a pulse width modulated signal having a pulse directly proportional to the phase angle θ. In addition, a low pass filter 424 may also be utilized to accept the pulse width modulated signal from the pulse width modulator 422 and produce a DC output signal whose DC average is directly proportional to the phase angle θ.

Figure 5:
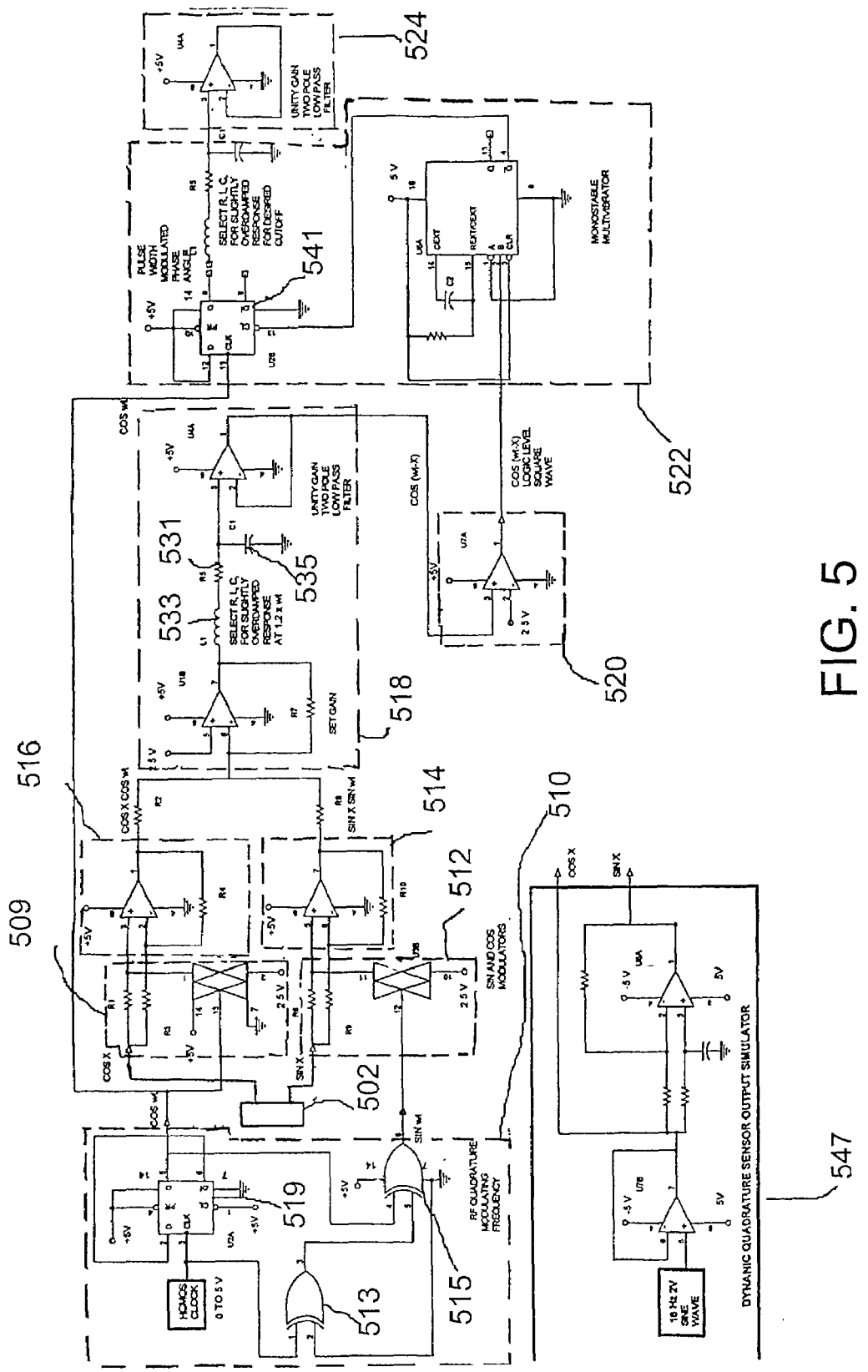
FIG. 5 is an exemplary circuit implementation for the block diagram phase angle detection system of FIG. 4.

One possible functional circuit implementation for the phase angle determining circuit block diagram of FIG. 4 is illustrated in FIG. 5. Digital logic 510 includes a D-type flip-flop 519 and two exclusive OR gates 513, 515. Digital logic 510 produces sin ωt and cos ωt square waves. The sin ωt square wave is then provided to a quadrature multiplier 512, which also receives the input sine signal, e.g., sin x, from a transducer 502, which may be a steering wheel sensor in one embodiment. The cos ωt square wave may be provided to the in phase multiplier 509. Low pass filters 514 and 516 may also be utilized to filter higher frequency harmonics before provide to the adder 518. Resistor 531, inductor 533, and capacitor 535 of the adder 518 may be selected for slightly overdamped response at 1.2×ωt.

The output of the adder 518 or cos(ωt−x) may then be provided to comparator 520. The output of the comparator 520 or square wave signal cos(ωt−x) may then be provided to pulse width modulator 522. The pulse width modulator 522 may include a D-type flip-flop 541 for producing a logic "1" at the leading edge of the cos ωt signal from digital logic 510, and may clear the logic "1" at the leading edge of the cos(ωt−x) square wave signal from comparator 520. Finally, a low pass filer 524 may also be utilized to accept the pulse width modulated signal from the pulse width modulator 522 and produce a DC output signal whose DC average is directly proportional to the phase angle θ. A circuit simulator 547 may also be utilized to artificially produce in-phase and quadrature signals to exercise the phase angle circuit.

Figure 6:
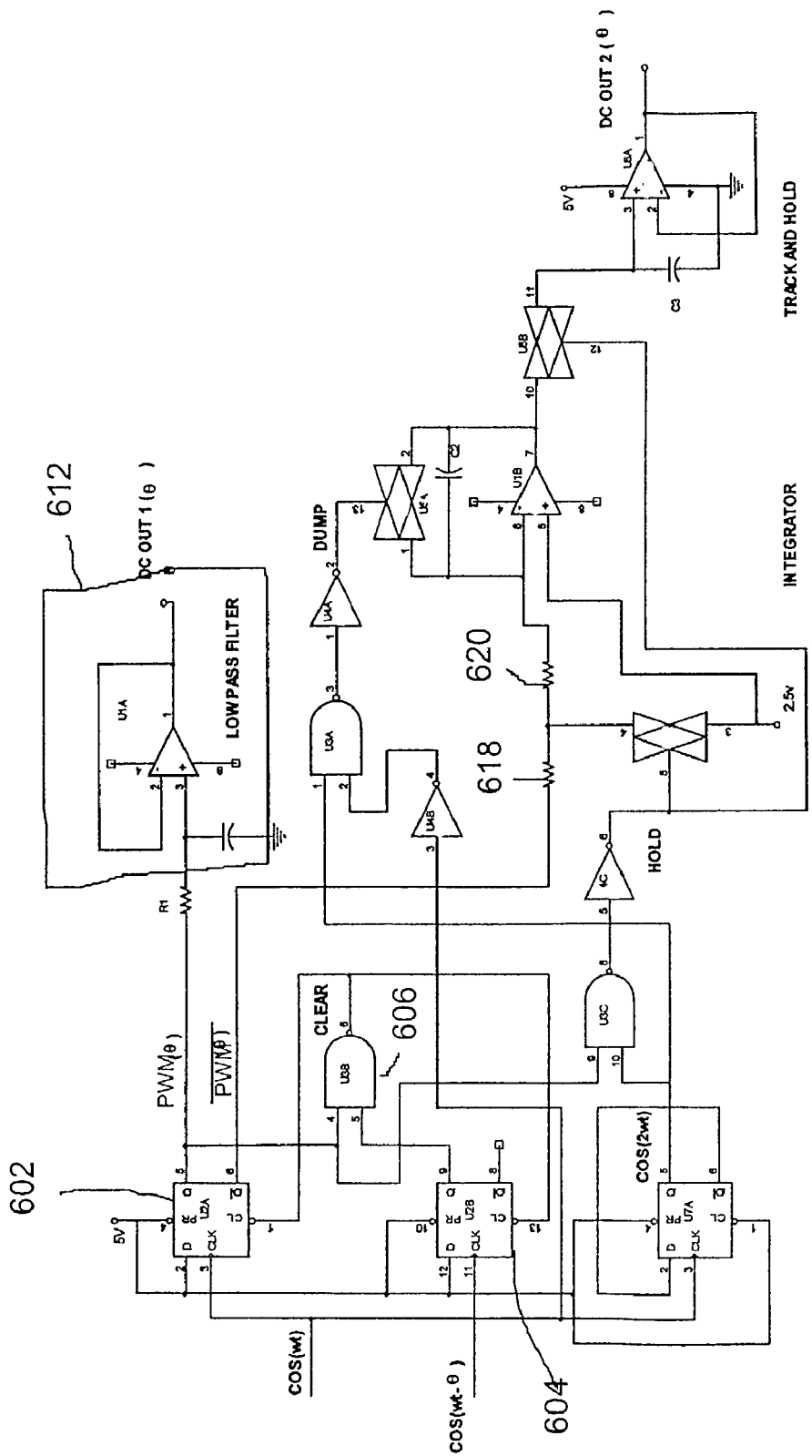
FIG. 6 is an exemplary circuit configuration for extracting a pulse width modulated signal and various DC output signals from input signals $\cos \omega t$ and $\cos(\omega t - \theta)$.

Turning to FIG. 6, an additional embodiment illustrates several ways to extract the phase angle θ from the cos ωt square wave signal and the cos(ωt−θ) square wave signals provided to the pulse wave modulator phase detector. One method is to utilize a D-type flip-flop 602 for producing a logic "1" at the leading edge of the cos ωt signal, and for clearing the logic "1" at the leading edge of the cos(ωt−θ) square wave signal. An additional D-type flip-flop 604 and AND gate 606 may also be utilized to perform this logic. The output of the flip-flop 602 is a pulse width modulated signal PWM (θ) and the inverse of PWM (θ). Low pass filter 612 may accept the PWM (θ) signal to produce DC OUT 1 having a DC average value proportional to the angle θ.

Another way of extracting a DC output signal, DC OUT 2, is also illustrated in FIG. 6. Although somewhat more involved than the method to extract DC OUT 1, DC OUT 2 provides a fast transient response time that can obtain the phase angle θ within 2 PWM pulses. Resistors 618 and 620 may be selected to cause integration of 0 degrees and 359 degrees PWM outputs to produce 0 volts and 5 volts respectively. Their actual values would further depend on the modulation frequency ωt.

Figure 7:
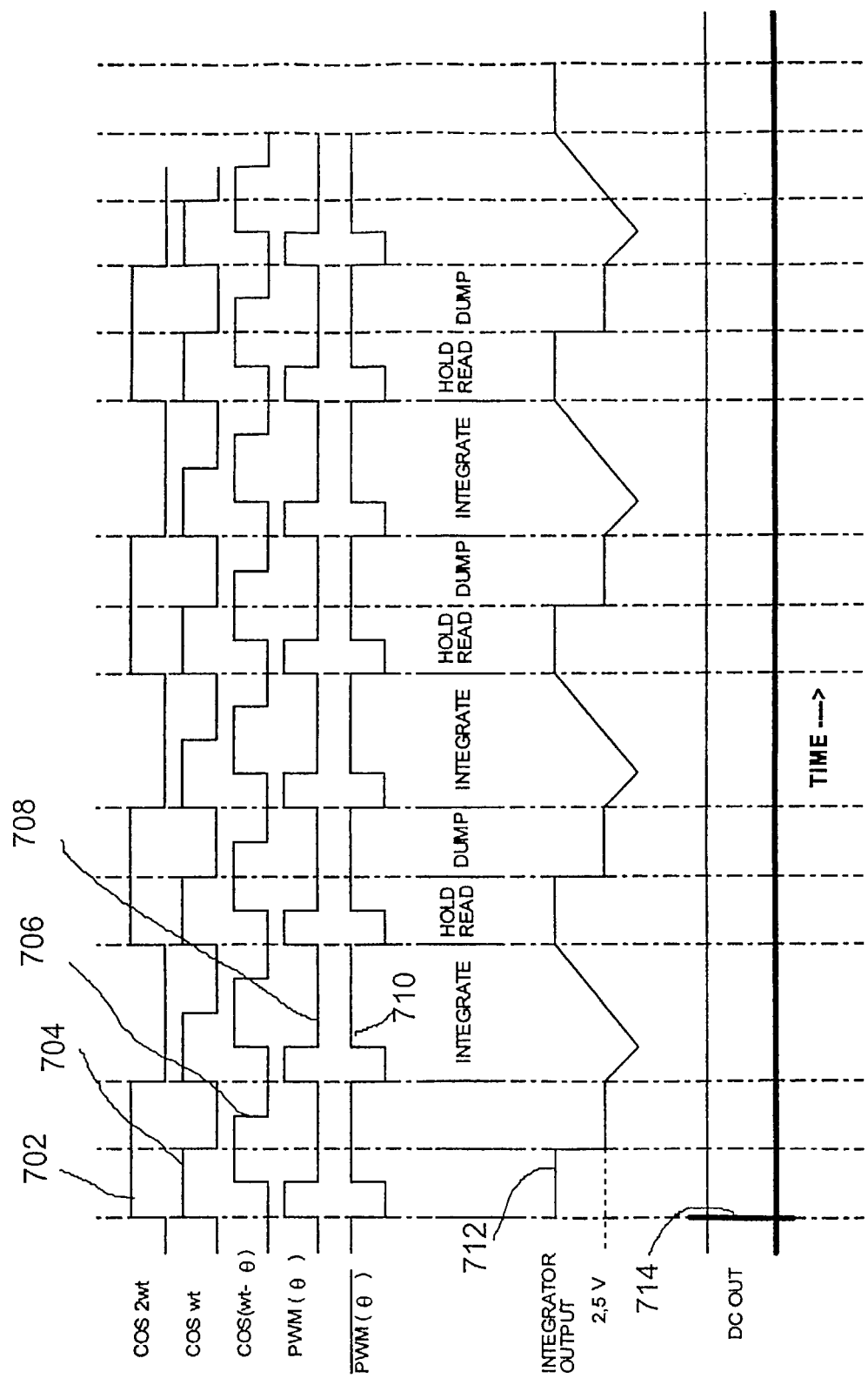
FIG. 7 is a timing diagram illustrating the timing of various signals consistent with the exemplary circuit of FIG. 6.

A timing chart corresponding to the circuitry of FIG. 6 is illustrated in FIG. 7. The PWM (θ) plot 708 may be triggered to a logical one at the leading edge pulse of the cos ωt square wave signal 704. The PWM (θ) plot 708 may then be also cleared at the leading edge pulse of the cos(ωt−θ) signal 706. The inverse of the PWM (θ) plot 708 is illustrated by plot 710. Consistent with the circuitry of FIG. 6, integration of the PWM (θ) plot 708 is accomplished to produce integrator output plot 712. DC OUT 2 may then resolve the phase angle θ within 2 PWM pulses.

Slight modification of the integrator timing circuit of FIG. 6 may be effective in reducing noise at the expense of response time by integration of the PWM signal 708 over several cycles of ωt before sampling the output integrator. A digital integrator circuit for extracting the phase angle θ from the PWM signal may also be utilized.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention as defined in the appended claims.

What is claimed is:

1. A system for sensing a rotational angle of an object relative to a predetermined position, said system comprising:
   a transducer configured to sense said rotational angle of said object and to provide a first input signal and a second input signal based on said rotational angle;
   a rotational angle determining circuit for determining said rotational angle from said first input signal and said second input signal, said rotational angle determining circuit comprising:
   an input circuit configured to receive said first input signal and said second input signal and to provide a third signal, said input circuit comprising
      a first multiplier circuit configured to receive said first input signal and a first sinusoidal signal and provide a first multiplier output signal, a second multiplier circuit configured to receive said second input signal and a second sinusoidal signal and provide a second multiplier output signal, and an adder circuit configured to sum said first output multiplier signal and said second output multiplier signal and to provide said third signal, said third signal being a sum of said first output multiplier signal and said second output multiplier signal; and an output circuit configured to receive said third signal and to provide an output signal representative of a phase angle, said output circuit comprising a phase modulator circuit configured to provide an output square wave signal having a width based on said phase angle.

2. The system of claim 1, wherein said first input signal and said second input signal comprise sinusoidal signals and said third signal comprises a square wave signal.

3. The system of claim 2, wherein said first input signal comprises a sin θ signal, said second input signal comprises a cos θ signal, said third signal comprises a cos(ωt−θ) signal, and said phase angle is θ.

4. The system of claim 1, wherein said phase modulator circuit comprises a comparator and said third signal is a sinusoidal signal, said comparator configured to convert said sinusoidal signal to a square wave signal.

5. The system of claim 1, wherein said third signal is a square wave signal and said phase modulator circuit is configured to raise said output square wave signal to a logic high level based on a leading edge of a square wave signal provided by a signal generator and to lower said output square wave signal to a logic low level based on a leading edge of said third signal.

6. A system for sensing a rotational angle of an object relative to a predetermined position, said system comprising:

a transducer configured to sense said rotational angle of said object and to provide a first input signal and a second input signal based on said rotational angle;

a rotational angle determining circuit for determining said rotational angle from said first input signal and said second input signal, said rotational angle determining circuit comprising:

an input circuit configured to receive said first input signal and said second input signal and to provide a third signal, said input circuit comprising a first multiplier circuit configured to receive said first input signal and a first sinusoidal signal and provide a first multiplier output signal, a second multiplier circuit configured to receive said second input signal and a second sinusoidal signal and provide a second multiplier output signal, and an adder circuit configured to sum said first output multiplier signal and said second output multiplier signal and to provide said third signal, said third signal being a sum of said first output multiplier signal and said second output multiplier signal; and an output circuit configured to receive said third signal and to provide an output signal representative of a phase angle, said output circuit comprising a DC output circuit configured to provide a DC output signal having a DC output level based on said phase angle.

* * * * *